United States Patent
Vergani et al.

(10) Patent No.: US 6,776,970 B1
(45) Date of Patent: Aug. 17, 2004

(54) GETTER MATERIALS FOR DEOXYGENATING AMMONIA/OXYGEN GAS MIXTURES AT LOW TEMPERATURE

(76) Inventors: Giorgio Vergani, Via della Birona 27, 20052, Monza Milan (IT); Marco Succi, Via Lomonaco 9, 20131, Milan (IT); Carolina Solcia, Via Alberto da Guissano 24, 20145, Milan (IT)

( * ) Notice: Subject to any disclaimer, the term of this patent is extended or adjusted under 35 U.S.C. 154(b) by 0 days.

(21) Appl. No.: 08/961,792

(22) Filed: Oct. 31, 1997

Related U.S. Application Data

(63) Continuation of application No. 08/686,583, filed on Jul. 26, 1996, now Pat. No. 5,716,588.

(30) Foreign Application Priority Data

Aug. 7, 1995 (IT) .......................................... MI95A1756

(51) Int. Cl.[7] .................................................. B01J 8/00
(52) U.S. Cl. ........................ 422/177; 422/171; 422/168; 422/211; 252/181.1
(58) Field of Search ................................ 422/169–171, 422/177, 188, 189, 190, 211; 423/219; 34/72; 252/181.1, 181.3, 181.4

(56) References Cited

U.S. PATENT DOCUMENTS

| | | | | |
|---|---|---|---|---|
| 3,852,406 A | * | 12/1974 | Krauss et al. | 423/219 |
| 4,075,306 A | * | 2/1978 | Muromura | 423/219 |
| 4,586,561 A | * | 5/1986 | Franco et al. | 165/1 |
| 4,839,085 A | * | 6/1989 | Sandrock et al. | 252/181.6 |
| 5,213,767 A | * | 5/1993 | Smith et al. | 422/177 |
| 5,284,629 A | * | 2/1994 | Henderson et al. | 422/171 |
| 5,536,302 A | * | 7/1996 | Golden et al. | 95/138 |
| 5,669,961 A | * | 9/1997 | Baker et al. | 95/115 |

FOREIGN PATENT DOCUMENTS

| | | |
|---|---|---|
| EP | 0 240 270 A1 | 7/1987 |
| EP | 484 301 B1 * | 5/1992 |
| EP | 0 365 490 B1 | 10/1993 |
| EP | 0 484 301 B1 | 12/1994 |
| JP | 2509600 B2 | 2/1981 |
| JP | 60166206 | 2/1984 |
| JP | 2-651611 | 11/1988 |
| JP | 335992832 | 11/1991 |
| WO | WO 94/25395 | 10/1994 |

OTHER PUBLICATIONS

N-150 Gas Purification Catalyst, Nissan Girdler Catalys Co., Ltd., Jan. 1990, pp. 1–5.

* cited by examiner

Primary Examiner—Hien Tran
(74) Attorney, Agent, or Firm—Perkins Coie LLP; Paul L. Hickman; David B. Dort

(57) ABSTRACT

A method for removing oxygen from ammonia at low temperature is described. In one embodiment, oxygen contaminated ammonia is contacted with a getter material that includes iron and manganese that sorbs oxygen to yield ammonia that is substantially oxygen free. In one embodiment, the process of contacting ammonia with the getter material takes place at about 25° C. In another embodiment the weight ratio between iron and manganese is about 7:1. In another embodiment, the getter material is dispersed on an inert support of specific surface greater than 100 m$^2$/g. In one embodiment, impure ammonia is contacted with getter material including iron and manganese that sorbs oxygen and with a drying agent that absorbs water to yield deoxygenated anhydrous ammonia. In yet another embodiment, an apparatus consisting of a gas inlet, gas purification chamber and gas outlet that deoxygenates ammonia when charged with getter material that includes iron and manganese is described. In one embodiment, getter material and drying agent are mixed together inside the gas purification chamber. In another aspect a method for producing semiconductor devices with high purity ammonia is described.

17 Claims, 2 Drawing Sheets

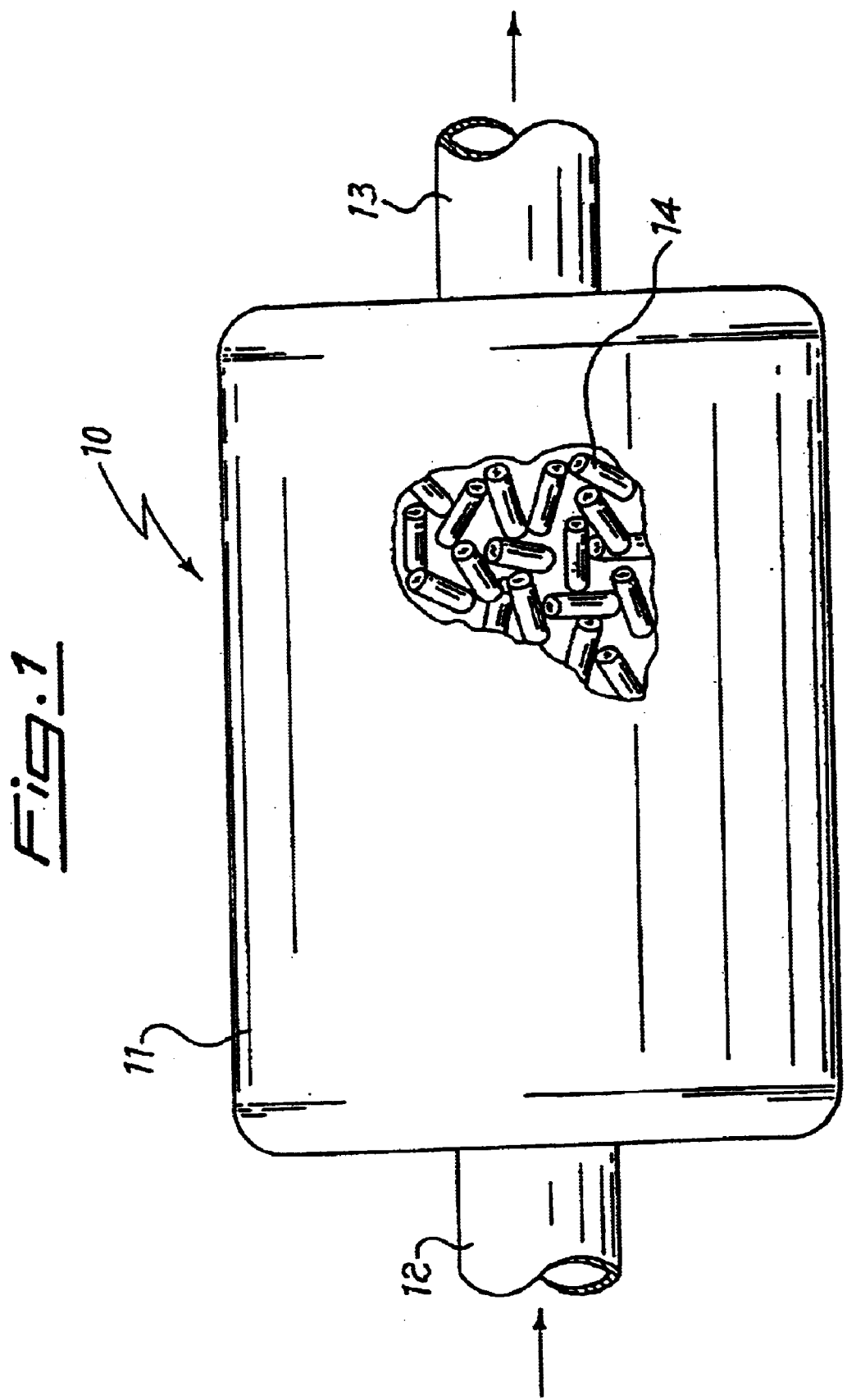

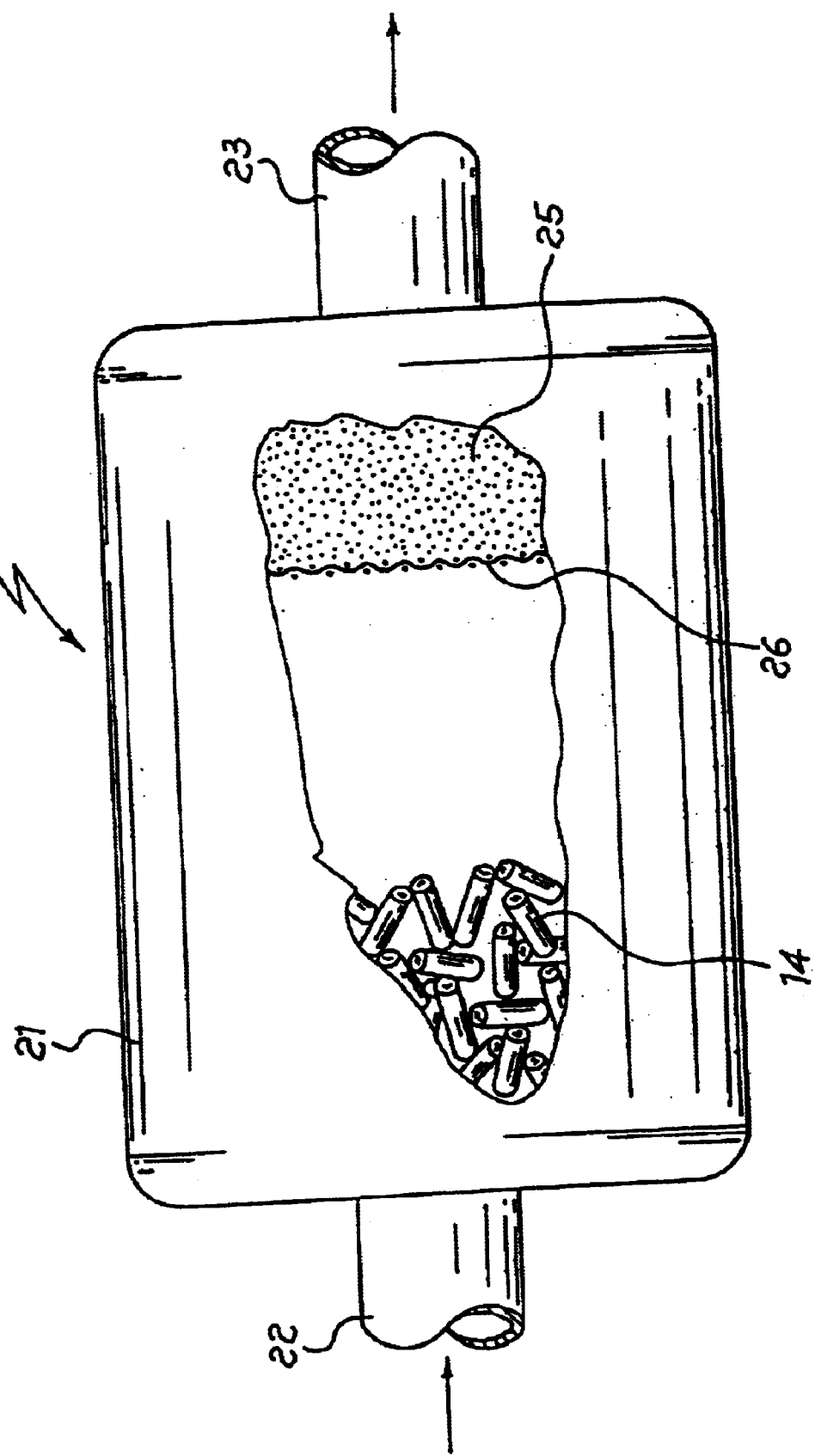

GETTER MATERIALS FOR DEOXYGENATING AMMONIA/OXYGEN GAS MIXTURES AT LOW TEMPERATURE

This application is a Continuation of prior application Ser. No. 08/686,583 filed on Jul. 26, 1996, now U.S. Pat. No. 5,716,588 which claims priority under 35 U.S.C. § 119 from Italian Patent Application Serial Number MI 95/A 001756, filed Aug. 7, 1995, which is incorporated herein by reference for all purposes.

BACKGROUND OF THE INVENTION

1. The Field of the Invention

The present invention relates to the purification of ammonia. More particularly, the present invention provides methods, materials and apparatus for removing oxygen from ammonia. More specifically, the present invention provides a novel getter material that removes oxygen from ammonia at low temperatures.

2. Background

Pure gases are essential in a number of fabrication processes important in the semiconductor manufacturing industry. Gas purity is positively correlated with the yield of integrated circuits in semiconductor manufacturing and is especially critical in the fabrication of advanced modern transistors which are easily damaged by small amounts of contaminants because of their small feature widths.

Ammonia ($NH_3$) is a process gas of primary importance in the semiconductor industry for the formation of nitride layers in electronic transistors through chemical vapor deposition and epitaxy processes. More specifically, ammonia is most commonly used for the formation of silicon nitride and silicon oxynitride films by direct nitridation of silicon oxide. Silicon nitride is both a more effective barrier to alkali ion migration and more resistant to thermal oxidation than silicon oxide and is thus particularly useful as a cover layer in metal-on-silicon (MOS) technology and as a mask when selective oxidation of the semiconductor is required. Silicon oxynitride films have physical properties intermediate between silicon and silicon nitride and have enormous potential for use in ultra large scale integrated circuits and as a passivating layer in gallium arsenide materials. Growing films of silicon nitride and silicon oxynitride requires ammonia of very high purity. Oxygen is a particularly harmful contaminant because its high chemical reactivity leads to its ready incorporation as an impurity into film during thermal nitridation of silicon oxide.

Getter materials comprise metals and metal alloys that sorb various gas molecules such as carbon oxides ($CO_x$, where x is 1 or 2), hydrogen ($H_2$), nitrogen ($N_2$), oxygen ($O_2$) and water ($H_2O$) and thus have been widely used for the purification of gases. In this application, advantage is taken of the ability of getter materials to sorb certain various compounds preferentially from gaseous mixtures. For example, such uses include the removal of carbon oxides (CO and $CO_2$), nitrogen ($N_2$), methane ($CH_4$), and oxygen ($O_2$) from hydrogen. The gettering function, and even the particular species that are sorbed, depends on the temperature of the getter materials.

Particularly useful are non-evaporable getter ("NEG") materials, which include zirconium or titanium-based alloys in combination with elements such as aluminum, vanadium, iron, nickel or other transition elements or their combinations. Examples of getter materials include the alloy having the composition Zr 84%—Al 16% by weight, which is manufactured and sold by SAES Getters S.p.A. (Milan, Italy) under the name "St 101®", and the alloy having the composition Zr 70%—V 24.6%—Fe 5.4% by weight, also manufactured and sold by the SAES Getters under the tradename "St 707".

The use of getter materials to remove oxygen from ammonia has been disclosed, for example, in European Patent No. 484-301-B1 assigned to the SAES Getters and incorporated herein by reference for all purposes, which describes contacting oxygen containing ammonia with the getter alloy St 707 that selectively absorbed oxygen from the gaseous mixture. However, despite the effectiveness of the patented process in purifying ammonia, a number of practical difficulties related to the 100–150° C. operating temperature of the getter alloy prevent significant industrial use of this method. First, St 707 decomposes ammonia at these elevated temperatures. Second, if the ammonia is contaminated with large concentrations of oxygen, then oxygen absorption by St 707, which is extremely rapid at the operating temperature of the getter alloy, can lead to an exothermic autocatalytic reaction that can explosively destroy the gas purification device. Finally, gas purification processes that operate at ambient temperature (i.e., at or about room temperature or 25° C.) are preferred in the semiconductor industry because of cost considerations and engineering simplicity.

Therefore, a process that would remove oxygen from ammonia at about room temperature is highly desirable.

SUMMARY OF THE INVENTION

The present invention provides, in one aspect, a method that removes oxygen from oxygen contaminated ammonia to yield ammonia that is substantially oxygen free at low temperatures. Thus, the present process will be seen to provide a method for deoxygenating ammonia that avoids the above described problems with current methods that remove oxygen from ammonia Furthermore, the present invention offers significant cost and design advantages over the prior art.

In one embodiment, the present invention provides a method that removes oxygen from oxygen contaminated ammonia that comprises contacting the impure ammonia with a getter material that includes iron and manganese that sorbs oxygen to provide ammonia substantially free from oxygen at moderate temperatures. In one particular embodiment, the process of contacting the ammonia with the getter material takes place at about 25° C. In another embodiment, the weight ratio between iron and manganese is about 7:1. In yet another embodiment, the getter material is deposited on an inert support of specific surface greater than about 100 $m^2/g$.

In another embodiment, the present invention provides a method that removes oxygen from ammonia that comprises contacting the impure ammonia with a getter material that includes iron and manganese that sorbs oxygen and with a drying agent that absorbs water to yield ammonia that is substantially free from oxygen and water impurities. In one particular embodiment, the process of contacting the ammonia with the getter material takes place at about 25° C. In another embodiment, the weight ratio between iron and manganese of the getter material is about 7:1. In yet another embodiment, the getter material is deposited on an inert support of specific surface greater than about 100 $m^2/g$.

In still another embodiment, the present invention provides an apparatus consisting of a gas inlet, gas purification chamber and gas outlet where impure ammonia enters through the gas inlet, contacts a getter material which includes iron and manganese that sorbs oxygen in the gas purification chamber and exits through the gas outlet substantially free of oxygen. In one particular embodiment, the temperature of the gas purification chamber is maintained at about 25° C. In another embodiment, the weight ratio between iron and manganese of the getter material is about 7:1. In yet another embodiment, the getter material is deposited on an inert support of specific surface greater than about 100 m$^2$/g. In one embodiment, a drying agent is co-mingled with the getter material in the gas purification chamber to remove water from ammonia. In another embodiment, the drying material is physically separated from the getter material in the gas purification chamber. In still another embodiment, the drying agent and the getter material are present in separate, connected gas purification chambers.

In yet another embodiment, the present invention provides a method for producing a semiconductor device with high purity ammonia that comprises contacting oxygen contaminated ammonia with a getter material that includes iron and manganese that sorbs oxygen to provide ammonia substantially free from oxygen; introducing the purified ammonia into a semiconductor wafer processing chamber, and processing a semiconductor wafer in the processing chamber to yield a semiconductor device. In one particular embodiment, the process of contacting the ammonia with the getter material takes place at about 25° C. In another embodiment, the weight ratio between iron and manganese of the getter material is about 7:1. In yet another embodiment, the getter material is deposited on an inert support of specific surface greater than about 100 m$^2$/g. In still another embodiment, the ammonia is also contacted with a drying agent prior to entering the semiconductor processing chamber.

These and other aspects and advantages of the present invention will become more apparent when the Description below is read in conjunction with the accompanying Drawings.

BRIEF DESCRIPTION OF THE DRAWINGS

FIG. 1 is an illustration of a gas purification device constructed in accordance with one embodiment of the present invention.

FIG. 2 is an illustration of a gas purification device constructed in accordance with a second embodiment of the present invention.

DESCRIPTION OF SPECIFIC EMBODIMENTS

According to a first aspect, the present invention provides a method for removing oxygen from ammonia gas contaminated with oxygen comprising contacting the oxygen contaminated ammonia gas with a getter material including iron and manganese that sorbs oxygen to yield ammonia that is substantially oxygen free (i.e., containing less than about 1 part per billion (ppb) of oxygen). In one embodiment, the operational temperature of the getter material of the invention is between about 50° C. and about –20° C. In one particular embodiment, the operational temperature of the getter material of the invention is about 25° C.

In one embodiment, the getter material of the invention is made up of a mixture of elemental iron and manganese. In one specific embodiment, the weight ratio of iron and manganese varies between about 10:1 and about 1:2. In a more specific embodiment, the weight ratio of iron and manganese varies between about 10:1 and about 1:1. In a still more specific embodiment, the weight ratio of iron and manganese varies between about 10:1 and about 2:1. In a yet more specific embodiment, the weight ratio of iron and manganese varies between about 10:1 and about 4:1. In a still more specific embodiment, the weight ratio of iron and manganese varies between about 10:1 and about 5:1. In a still more specific embodiment, the weight ratio of iron and manganese varies between about 9:1 and about 6:1. In a yet more specific embodiment, the weight ratio of iron and manganese varies between about 8:1 and about 6:1. In a most specific embodiment, the weight ratio of iron and manganese is about 7:1. A material similar to that provided by the current invention is sold by Nissan Girdlar Catalyst Co. Ltd. for the purification of inert gases such as helium, argon and nitrogen where the weight ratio of iron and manganese is about 1.8:1.

In one embodiment, the getter material of the invention is a finely divided metal powder of specific surface greater than about 100 m$^2$/g. In another embodiment, the getter material is dispersed on inert supports such as zeolites, porous alumina, porous silica and molecular sieves with a specific surface greater than about 100 m$^2$/g. Other similar supports will be known to those skilled in the getter arts.

The preparation of metals deposited on inert supports is achieved through techniques of co-precipitation well known to those skilled in the metal arts. In one embodiment, manganese and iron acetates, chlorides or nitrates are dissolved in aqueous solvent and inert support is added. However, less polar solvents, such as alcohols and esters, can also be used if the metal is complexed with an organic ligand such as acetyl acetone. Other organic ligands will be known to those of skill in the metal arts. Increasing the pH of the solution precipitates the iron and manganese hydroxides which are dried after isolation. The hydroxides are thermally decomposed at high temperature to yield iron and manganese oxides which are then sequentially heated under hydrogen and argon to yield the metallic elements dispersed on an inert support.

The getter material of the invention is generally contained within a gas purification chamber that is in fluid communication with both a gas inlet and gas outlet. Many chamber configurations will be known to those with skill in the gas purification arts. One embodiment of a gas purification device provided by the present invention is illustrated in FIG. 1. The gas purification device 10 is comprised of gas inlet 12 and gas outlet 13 on two opposite sides of chamber 11. Gas inlet 12 and gas outlet 13 are provided with standard connections (not shown) known to those of skill in the gas purification arts for connection to gas lines leading to and away from gas purification device 10. The above described getter material 14 is inside chamber 11 which can be made of a number of metallic materials. In one embodiment, the chamber 11 is made of AISI 316 steel. In another embodiment, the inner surfaces of the body are electrofinished so that the surface roughness is lower than about 0.5 mm. In still another embodiment, the getter material is enclosed inside a metallic gauze or porous diaphragm. In yet another embodiment, the getter material is compressed into pellets of powder as shown in FIG. 1.

Semiconductor manufacturing processes that utilize ammonia are extremely sensitive to moisture in addition to oxygen. Thus, in one embodiment, the ammonia is dried to remove residual water in addition to being deoxygenated. In one embodiment, ammonia is contacted with chemicals such as barium oxide, calcium oxide or strontium oxide that react with water. In another embodiment, ammonia is contacted with material such as zeolites and molecular sieves that physically absorb water. In some embodiments, the drying agent is directly mixed with the getter material. In other embodiments, the drying agent and the getter material are physically separated. For example, in one embodiment, ammonia is contacted first with the getter material and then with the drying agent. Alternatively, the ammonia is contacted first with the drying agent and then with the getter material.

The above described embodiment of a gas purification device provided by the present invention is illustrated in FIG. 2 at 20. Here ammonia is contacted first with getter material 14 and then with drying material 25 inside gas purification device 20. Gas purification device 20 is comprised of gas inlet 22, gas purification chamber 21 and gas outlet 23. Getter material 14 is deposited in the chamber at a location close to gas inlet 22, while drying material 25 is closer to gas outlet 23. A gas permeable mechanical member 26, which in one embodiment is a wire gauze, physically separates the getter material and drying agent. In another embodiment, the getter material and the drying agent are contained in two separate, connected gas purification chambers.

In another aspect, the present invention provides a method for manufacturing semiconductor devices that require very pure ammonia for their fabrication. Impure ammonia is contacted with getter material that includes iron and manganese which removes residual oxygen prior to entering a semiconductor processing chamber where it is used to fabricate a semiconductor device. In another embodiment, the ammonia is further contacted with a drying agent before entering the semiconductor processing chamber. Those of skill in the semiconductor manufacturing arts will be familiar with the methods, devices and processes in which high purity ammonia is used in the fabrication of semiconductor devices.

The superior performance of the methods and materials provided by the present invention is illustrated in Examples 7 and 8 below. In Example 7, gallium nitride films grown on a sapphire monocrystal using ammonia purified by the method of the present invention were found to have clearly superior electron mobility qualities (measured by the Hall test) as compared to films grown using ammonia gas purified by prior art techniques. As described in Example 7, films prepared using ammonia purified by the method of the present invention were found to have Hall mobility that was about three-fold greater than films prepared using ammonia purified by standard techniques (150 cm$^2$/V·s vs. 48 cm$^2$/V·s). Photoluminescence measurements, described in Example 8, also showed that significantly higher film quality was achieved when ammonia purified by the method of the present invention was used to grow gallium nitride films. Films prepared using ammonia purified the method of the invention were found to have significantly higher purity than films prepared using ammonia purified by standard methods as determined by measurements of the full width at half maximum (FWMH) of the photoluminescence peak heights at 360 nanometers (nm). These measurements indicated that the FWMH of films prepared using ammonia purified by the method of the invention were one-half those of films prepared using ammonia purified by standard methods.

EXAMPLES

The following examples describe specific aspects of the invention to illustrate the invention and aid those of skill in the art in understanding and practicing the invention. However, these examples should not be construed as limiting the invention in any manner.

Example 1

Preparation of Iron and Manganese Getter Material Supported on Zeolites.

About 96.0 grams of ferric chloride hexahydrate ($FeCl_3.6H_2O$) and about 41.7 grams of manganese chloride tetrahydrate ($MnCl_2.4H_2O$) were dissolved in about 0.5 liters of distilled water. The solution was heated to about 50° C. with stirring until the metal salts dissolved. About 7.5 grams of pulverized 13X zeolites were added after the solution had been diluted to about 1.0 liter and heated to about 60° C. After about 5 minutes of stirring the solution was cooled to about 40° C. and concentrated ammonia was added until the pH reached about 7.5 when the metal hydroxides precipitated. The yield of precipitate was found to be enhanced by increasing the temperature of the solution to about 60° C. for about 5 minutes. After cooling to about 30° C., concentrated ammonia was added until the solution reached a pH of about 9. After about five minutes the solution was centrifuged and the collected precipitate was repeatedly washed with a heated (about 50° C.) aqueous solution of ammonia having a pH of about 8. About four grams of amorphous silica was added to the precipitate to improve the mechanical consistency of the material and the resulting mixture was agitated until approximately homogeneous. After drying at about 75° C. for about 24 hours the mixture was calcined at about 700° C. for about 4 hours to convert both the iron and manganese hydroxides into their corresponding oxides.

The steel chamber of a gas purification device, shown in FIG. 2 was charged with about 22 grams of the manganese and iron getter material supported on zeolites. The gas purification device was connected to a gas line through inlet and outlet connections with valves for controlling the gas flow located upstream and downstream of the gas purification device. The gas purification device was heated at about 400° C. under a steady stream of hydrogen for about four hours and then for approximately another four hours at 400° C. then under a steady stream of argon, producing a mixture of iron and manganese oxides in reduced form. The gas purification device was then cooled to room temperature under a stream of argon to provide a getter material of reduced iron and manganese oxides supported on zeolite.

Example 2

Assaying the Oxygen Absorbing and Ammonia Cracking Capability of Getter Material Consisting of Iron and Manganese Supported on Zeolites.

The assay was carried out by measuring indirectly the capability of the iron and manganese getter material of the invention to remove oxygen without producing hydrogen in a nitrogen flow after the getter material was conditioned under a stream of ammonia for about 10 days. Direct assay of oxygen removal from ammonia is not possible because reliable instrumentation for measuring oxygen concentration in ammonia is not currently available.

The steel chamber of a gas purification device, illustrated in FIG. 2, was charged with about 23 grams of manganese and iron getter material supported on zeolite. About 19.8 grams of $FeCl_3.6H_2O$, about 11.6 grams of $MnCl_2.4H_2O$, about 7.5 grams of zeolite and about 4 grams of amorphous silica were processed using the procedure of Example 1 to yield the supported iron and manganese getter material where the weight ratio of iron to manganese was about 1.8:1 and the ratio of total metals to zeolites was about 4:1. The density of the getter bed typically varied between about 0.85 and about 1.1 gram/cm$^3$. The supported getter material was subsequently conditioned at about 25° C. in four steps. First, ammonia was flowed through the gas purification device at a rate of about 0.1 liters per minute (l/min) at a pressure of about 2.2 bars for about 4 hours. Second, the gas purification device was kept under ammonia at about 2.2 bars for about 10 days. Then, gaseous ammonia was flowed through the gas purification device at a rate of about 0.1 l/min at about 2.2 bars for about one hour. Finally, in the fourth and last step, argon was flowed through the gas purification device at a rate of about 0.3 l/min at about 2 bars for about 0.5 hours.

The amount of hydrogen fixed by the iron and manganese getter material during the ammonia conditioning was assayed by flowing pure nitrogen through the purifier into a Trace Analytical RGA3 analyzer. The iron and manganese getter material was determined not to crack ammonia under these conditions since the measured concentration of hydrogen in the effluent nitrogen was lower than the sensitivity limit of the instrument which is about 10 ppb.

The ability of the conditioned iron and manganese getter material to absorb oxygen was measured by flowing nitrogen containing 100 parts per million (ppm) of oxygen, at a rate of about 0.1 l/min at a pressure of about 3 bars through the gas purification device and analyzing the oxygen concentration of the effluent gas on an Osaka MK3Y instrument. The iron and manganese getter material was considered active if the oxygen concentration of the effluent gas was less than 1% of the oxygen concentration of the incoming gas. After seven days of gas flow the getter material was deactivated. The calculated absorption capacity of the iron and manganese getter material was determined by standard methods to be about 4 liters of oxygen for each liter of getter material (l/l) which is significantly superior to the 1 l/l–2 l/l absorption achieved using the methods and materials of the prior art.

Example 3
Preparation and Assay of 7:1 Iron:Manganese Getter Material Supported on Zeolites.

The getter material was prepared according to the method of Example 1 but using about 92.54 grams of $FeCl_3$ and about 10.4 grams of $MnCl_2$ and calcining at about 560° C. to yield a getter bed possessing an iron-to-manganese ratio of about 7:1. The getter material was then assayed as in Example 2. An absorption capacity of about 12 liters of oxygen for each liter of getter material was found, which capacity is far superior to the 1 l/l–2 l/l absorption achieved using the methods and materials of the prior art.

Example 4
Preparation and Assay of 0.93:1 Iron:Manganese Getter Material Supported on Zeolites.

The getter material was prepared according to the method of Example 1 but using about 53.25 grams of $FeCl_3$ and about 44.97 grams of $MnCl_2$ and calcining at about 560° C. to yield a getter bed possessing an iron-to-manganese ratio of about 0.93:1. The getter material was then assayed as in Example 2. An absorption capacity of about 3.4 liters of oxygen for each liter of getter material was found. This result is significantly superior to the 1 l/l–2 l/l absorption achieved using the methods and materials of the prior art.

Example 5
Preparation of Gallium Nitride Film

The 0001 face of a sapphire monocrystal was prepared for film growth by degreasing in organic solvent, etching in acid, heating at about 1060° C. under a hydrogen atmosphere, and finally flushing with ammonia Film growth was performed in a three part process using standard methods and materials. At a temperature of about 500° C., a mixture of gases consisting of ammonia (about 2.5 l/min), hydrogen (about 4.0 l/min) and trimethyl gallium (about 29 $\mu$mol/min) was admitted to a chamber containing the sapphire monocrystal where the gases reacted under metal organic chemical vapor deposition conditions (MOCVD) to form the gallium nitride film. The gas flow was discontinued and the gallium nitride film was recrystallized at about 1000° C. Finally, the gas flow was recommenced and film growth was continued. The final film (Sample 1) was about 1 $\mu$m thick.

Example 6
Preparation of Gallium Nitride Film Using Purified Ammonia

Ammonia was purified by an iron-manganese getter material prepared according to the method of Example 1 before being used in the procedure of Example 5. The resulting film (Sample 2) was about 1 $\mu$m thick.

Example 7
Assaying Film Quality Using the Hall Test

The gallium nitride films prepared in Example 5 (Sample 1) and Example 6 (Sample 2) were assayed using a standard Hall test which correlates film quality with increased electron mobility. Sample 2, which was prepared with purified ammonia, was found to have a Hall mobility of about 150 $cm^2$/V second which was some three times greater than the measured Hall mobility of Sample 1 which was about 48 $cm^2$/V second. The Hall results clearly illustrated that using ammonia purified by the method of the present invention to grow gallium nitride films significantly improved the quality of the films so produced.

Example 8
Assaying Film Quality Using Photoluminescence

The gallium nitride films prepared in Example 6 (Sample 1) and Example 7 (Sample 2) were assayed using photoluminescence. Samples 1 and 2 were irradiated at about 325 nm with a helium-cadmium (HeCd) laser followed by measurement of the ultraviolet (UV) spectrum between about 340 nm and about 390 nm. The sharpness of a characteristic gallium nitride peak at 360 nm is indicative of film quality. Sample 2 which was prepared with purified ammonia was found to have a peak width (e.g., full width at half maximum peak height, FWMH ) of about 7.0 nm which was significantly less than the measured peak width of Sample 1 which was about 14.6 nm. The photoluminescence results clearly illustrate that using ammonia, purified by the method of the present invention, to grow gallium nitride films significantly improved their quality.

What is claimed is:

1. A apparatus for producing, at an operating temperature between −20° C. and 50° C., pure, substantially oxygen-free ammonia suitable for use in semi-conductor processing said apparatus comprising:

an ammonia source;

a gas purification chamber having a gas inlet through which ammonia contaminated with oxygen from said ammonia source can be introduced into the chamber, contained within said gas purification chamber, a getter material consisting essentially of mixture of iron and manganese oxides in reduced form and in a conditioned state produced by exposing the oxides in reduced form to ammonia gas under pressure prior to use of the apparatus in deoxygenated ammonia gas, said getter material being characterized by the ability to sorb oxygen as a contaminant in ammonia at a temperature between −20° to 50° C.; and in fluid communication with said gas purification chamber a gas outlet from which decontaminated ammonia can be released from the chamber.

2. The apparatus of claim 1, wherein said getter material is on a support.

3. The apparatus of claim 1, wherein said getter material is characterized by the ability to sorb oxygen as a contaminant in ammonia at about 25° C.

4. The apparatus of claim 1 wherein said getter material is a finely divided metal powder of specific surface greater than about 100 $m^2/g$.

5. The apparatus of claim 2, wherein the support is selected from the group consisting of zeolites, porous alumina, porous silica, and molecular sleves.

6. The apparatus of claim 5 wherein said supports have specific surface greater than about 100 $m^2/g$.

7. The apparatus of claim 1, wherein the weight ratio of said iron to said manganese in said getter material is between about 10:1 and about 1:2.

8. Then apparatus of claim 7, wherein the weight ratio of said iron to said manganese in said getter material is between about 10:1 and about 1:1.

9. The apparatus of claim 8 wherein the weight ratio of said iron to said manganese in said getter material is between about 10:1 and about 2:1.

10. The apparatus of claim 9 wherein the weight ratio of said iron to said manganese in said getter material is between about 10:1 and about 4:1.

11. The apparatus of claim 10 wherein the weight ratio of said iron to said manganese in said getter material is between about 10:1 and about 5:1.

12. The apparatus of claim 11 wherein the weight ratio of said iron to said manganese in said getter material is between about 9:1 and about 6:1.

13. The apparatus of claim 12 wherein the weight ratio of said iron to said manganese in said getter material is between about 8:1 and about 6:1.

14. The apparatus of claim 13 wherein said weight ratio of said iron to said manganese is about 7:1.

15. The apparatus of claim 1 wherein said gas purification chamber includes a drying material selected from the group consisting of barium oxide, calcium oxide, strontium oxide and zeolites.

16. The apparatus of claim 15 wherein said drying material is co-mingled with said getter material in said gas purification chamber.

17. The apparatus of claim 15 wherein said drying material is isolated from said getter material in said gas purification chamber.

* * * * *